United States Patent
Cohen-Zada (10) Patent No.: US 8,215,643 B2
(45) Date of Patent: Jul. 10, 2012

(54) APPARATUS FOR DELIVERING SEALANT AT A PREDETERMINED PRESSURE TO A STUFFING BOX OF A SHAFT

(75) Inventor: Vaitzman Cohen-Zada, Beer Sheva (IL)

(73) Assignee: Tamar (R.C.) Technologies Development Ltd., Beer Sheva (IL)

( * ) Notice: Subject to any disclaimer, the term of this patent is extended or adjusted under 35 U.S.C. 154(b) by 986 days.

(21) Appl. No.: 12/224,574

(22) PCT Filed: Feb. 27, 2007

(86) PCT No.: PCT/IL2007/000260
§ 371 (c)(1),
(2), (4) Date: Aug. 28, 2008

(87) PCT Pub. No.: WO2007/099535
PCT Pub. Date: Sep. 7, 2007

(65) Prior Publication Data
US 2009/0039108 A1    Feb. 12, 2009

(30) Foreign Application Priority Data
Feb. 28, 2006  (IL) .......................................... 174005

(51) Int. Cl.
*F16J 15/40* (2006.01)
(52) U.S. Cl. ........................................ 277/318; 277/408

(58) Field of Classification Search .......... 277/317–320, 277/408, 930
See application file for complete search history.

(56) References Cited

U.S. PATENT DOCUMENTS

| 3,067,763 A | 12/1962 | Bredtschneider |
| 3,876,213 A | 4/1975 | Miliczky et al. |
| 5,427,500 A | 6/1995 | Hyll |

FOREIGN PATENT DOCUMENTS

| DE | 829 249 | 1/1952 |
| DE | 43 05 145 | 8/1994 |
| EP | 0589138 | 3/1994 |
| FR | 806 024 | 12/1936 |

*Primary Examiner* — Gilbert Lee
(74) *Attorney, Agent, or Firm* — Robert G. Lev; Jeremy Ben-David (57) ABSTRACT

A delivery unit (40) for automatically delivering a viscous sealant at a predetermined pressure to a stuffing box (70) of a shaft (20) is disclosed. The delivery unit (40), such as a pressure booster incrementally displaceable piston, is controlled to deliver the sealant at a predetermined pressure on demand when the pressure of the sealant within said stuffing box is less than the predetermined delivery pressure being sufficient to promote adhesion of the sealant onto a shaft segment and to thereby prevent or retard the egress of working fluid from a corresponding working chamber (17) of a machine adapte to perform work by the shaft. A system for reducing the pressure of sealant within a stuffing box by use of the delivery unit and of an impeller-based dynamic seal is also disclosed.

11 Claims, 6 Drawing Sheets

APPARATUS FOR DELIVERING SEALANT AT A PREDETERMINED PRESSURE TO A STUFFING BOX OF A SHAFT

FIELD OF THE INVENTION

The present invention relates to the field of sealants. More particularly, the invention relates to an apparatus for automatically delivering a sealant at a predetermined pressure to a stuffing box of a shaft.

BACKGROUND OF THE INVENTION

Many types of heavy rotary machinery, including pumps, compressors, and turbines, (hereinafter a "rotary machine") produce work by means of a working fluid enclosed within a working chamber as its main shaft is rotated. Although the clearance between the shaft and the rotary machine housing is relatively small, the working fluid tends to leak from each housing opening through which the shaft extends (hereinafter referred to as a "shaft opening" for brevity). A seal is generally used in the proximity of a shaft opening, to prevent the leakage of working fluid therefrom.

Numerous seal types are known. For low speed rotary machines, a known seal type is a spring loaded gasket, such as an O-ring. For high speed rotary machines, one common type is the mechanical seal which consists of radial planar surfaces normal to the shaft axis and machined to surfaces of low surface roughness. One surface is gasketed to the housing while a second surface is driven by the shaft and sealed thereon by a secondary seal such as a bellows. Such a seal is generally expensive and tends to rupture at once without any prior indication. The repair of a faulty mechanical seal is costly and time consuming, necessitating extensive rotary machine downtime. Another type of high speed rotary machine seal is the compression rope packing seal. This type of seal abrades the shaft surface during a tightening and adjustment procedure. Although the rope packing slowly loosens and therefore provides early indication as to working fluid leakage, the packing material erodes relatively quickly due to frictional heat buildup and needs to be replaced often by the time consuming replacement procedure. Another known seal type is the labyrinth seal, which employs stationary teeth disposed in such a way that there is a small clearance between the teeth and the shaft periphery, in order to restrict flow by means of a torturous path and induced turbulence. Labyrinth seals are suitable for high shaft speeds; however they require accurate positioning with respect to the shaft and are therefore relatively expensive.

The present invention relates to the type of sealing material that is a high-viscosity non-Newtonian liquid, i.e. its viscosity varies as a function of its shear stress, and is made of a blend of synthetic fibers, lubricants, and binding agents (hereinafter referred to as the "sealant"). Such a sealant is generally introduced under pressure by an injection device, such as a manually operated injection gun, into a stuffing box which surrounds the shaft from an inlet port on the stuffing box exterior. Following injection of the sealant into the stuffing box, the inlet port is occluded with a suitable plug. The applied pressure causes the sealant to be pressed against the shaft and therefore promote its adhesiveness with respect to the shaft, along the gaps between finely spaced surface-texture irregularities. As a sufficient amount of sealant adheres to the portion of the shaft which is exposed to the sealant, the clearance between the shaft and the housing is reduced. The pressure differential between the working volume and the stuffing box is sufficiently reduced, or completely eliminated, to prevent working fluid leakage. Frictional forces acting on the shaft as it is rotated about the wall of the shaft opening result in erosion and diminishment of the sealant, and eventually the surface tension of the remaining sealant is not sufficient to prevent the leakage of the working fluid from a shaft opening.

Heretofore, the stuffing box has not been provided with means for indicating the occurrence of, or the rate of, sealant diminishment. Maintenance workers therefore replenish the sealant by use of the injection device upon estimation of sealant diminishment, when in reality there may be no need of a maintenance operation, or after an indication of working fluid leakage from the shaft opening. To reduce the number of time consuming and cost incurring maintenance operations, some maintenance workers tend to pressurize the sealant to a pressure greater than a suggested limit. When the injected sealant is overly pressurized, the solidified sealant overheats due to the increased frictional forces acting thereon. Heat is therefore transferred from the overheated solidified sealant to the working fluid. If the working fluid is water, for example, its temperature can exceed the maximum allowable working temperature and therefore is liable to boil or cavitate. There is therefore a need for an apparatus that can deliver sealant to a stuffing box on demand.

EP 0589138 discloses a spring loaded injectable packing fitting. A packing chamber between a valve stem and valve bonnet has a spring loaded packing injector, which replenishes the packing material normally lost during operation of the valve. The packing is injected through a check valve prior to use. This spring loaded fitting is suitable for the low speed of a valve shaft, but not for the high speed of a rotary machine shaft. Also, the spring induced load to which the fitting is exposed varies throughout the displacement of the spring. Thus the injector delivers the packing at a variable non-optimal pressure, which, when used for a high-viscosity non-Newtonian sealant, may be less than a minimal stuffing box sealant pressure suitable for preventing the leakage of the working fluid from a shaft opening or may be greater than a suggested limit.

It is an object of the present invention to provide an apparatus for delivering a viscous sealant to a stuffing box on demand.

It is an additional object of the present invention to provide an apparatus for delivering a viscous sealant at a predetermined pressure to a stuffing box.

It is an additional object of the present invention to provide an apparatus for delivering sealant to a stuffing box that requires a considerably reduced intervention of maintenance workers with respect to apparatus of the prior art.

It is an additional object of the present invention to provide an apparatus for delivering sealant to a stuffing box at an optimal replenishing time.

It is yet an additional object of the present invention to provide a sealant delivering apparatus of low cost.

It is yet an additional object of the present invention to provide an apparatus which reduces or prevents sealant overheating.

It is yet an additional object of the present invention to provide an apparatus which facilitates reduced sealant pressure while maintaining an equivalent level of sealing and of overall machine efficacy.

Other objects and advantages of the invention will become apparent as the description proceeds.

SUMMARY OF THE INVENTION

The present invention provides a viscous sealant delivery unit for automatically delivering said sealant at a predetermined pressure to a stuffing box of a shaft. As referred to herein, a "shaft" means a rotary shaft or a linearly displaceable shaft, such as one that reciprocates. As referred to herein, a "stuffing box" means a cavity in which said sealant is introduced under pressure that surrounds, or is in communication with one or more cavities that surrounds, a segment of said shaft.

The pressure of said sealant is sufficient for inducing sufficient adhesion of the sealant to said shaft segment in the proximity of a shaft opening from which the shaft exits a working chamber. The working chamber may be a working chamber of a rotary machine, e.g. a pump, compressor, and turbine, such that the adhered sealant prevents the infiltration of the working fluid of said machine into said sealant cavity. In response to erosion of the adhered sealant resulting from frictional forces between the rotating shaft and the surrounding sealant, the pressure of the sealant within the stuffing box is reduced, and additional sealant needs to be introduced to the stuffing box to maintain the sealant pressure at a desired level.

A viscous sealant delivery unit comprises conduit means in communication with an inlet port of a stuffing box to which a shaft segment is exposed; means for delivering a high-viscosity sealant through said conduit means to said inlet port; and means for controlling said delivery means to deliver said sealant at a predetermined pressure on demand when the pressure of said sealant within said stuffing box is less than said predetermined delivery pressure, said predetermined delivery pressure being sufficient to promote adhesion of said sealant onto said shaft segment and to thereby prevent or retard the egress of working fluid from a corresponding working chamber of a machine adapted to perform work by means of said shaft.

In one embodiment of the invention, the conduit means comprises a sealant chamber in which sealant is introducible thereto from a suitable reservoir, the delivering means comprises a piston incrementally displaceable within said sealant chamber, and the control means comprises means for applying a proximal linear driving force onto said piston which is suitable for pressurizing the sealant introduced in said sealant chamber to said predetermined delivery pressure.

In a preferred embodiment, the delivery unit comprises a piston retainer, a retainer cover, and a sealant chamber which is attached to, and preferably releasably engageable with, the underside of said retainer. The sealant chamber is also releasably engageable with a portion of the machine housing that surrounds the stuffing box inlet port such that the sealant chamber cavity is in fluid communication with the inlet port and with the stuffing box. The means for applying a proximal linear driving force is compressed air or any other gas pressurized to a pressure which is suitable for pressurizing the sealant introduced in said sealant chamber to the predetermined delivery pressure. The retainer cover has a central opening through which the pressurized gas is introduced into the piston retainer for proximally displacing the piston. As referred to herein, "proximal" means in a direction towards the stuffing box inlet port and "distal" means in a direction away from the stuffing box inlet port.

In one aspect, the sealant chamber is narrower than the piston retainer and the piston has a distal portion and a proximal portion having a smaller width than said distal portion such that sides of said distal portion are in resilient contact with walls of the retainer and sides of said proximal portion are in contact with walls of the sealant chamber, the length of said proximal portion being less than that of the sealant chamber walls.

In one aspect, the sealant chamber walls has straight, vertically disposed walls that narrow at its proximal end to form a neck from which sealant is dischargeable to the stuffing box.

Preferably, the delivery unit further comprises a position indicator connected to the piston which is indicative of the relative position of the piston and therefore of the amount of sealant retained in the stuffing box.

In one aspect, the conduit means comprises a conduit in fluid communication with the sealant chamber, said conduit being permanently attached to the machine housing and allowing pressurized sealant to flow therethrough to the inlet port of the stuffing box.

In one aspect, the delivery unit further comprises a controller and a pressure sensor in electrical communication with said controller for detecting the pressure within the stuffing box or a position sensor for detecting the relative position of the piston. The controller may emit a signal when the sealant pressure is less than a predetermined minimum value or when the amount of sealant retained in the sealant chamber is less than a minimum value. The controller may be in communication with the means for applying a proximal linear driving force and increase the proximal driving force when the sealant pressure is less than a predetermined minimum value.

In one embodiment of the invention, the delivering means is a pump for delivering sealant from a suitable reservoir to the stuffing box when the stuffing box pressure decreases below a predetermined level and the control means is a controller adapted to activate said pump when the stuffing box pressure is less than a first predetermined pressure and to deactivate said pump when the stuffing box pressure is greater than a second predetermined pressure.

The present invention is also directed to a dynamic seal for inducing a pressure barrier between a working chamber and a stuffing box. The net working fluid pressure to which the sealant is exposed can thereby be lowered, and therefore the sealant pressure may be lowered as well. A reduced sealant pressure results in a lower temperature of the sealant and in an increase of useful work that the machine can perform.

The pressure barrier also prevents solid particles, if suspended in the working fluid within the working chamber, from approaching the stuffing box and thereby reducing the effectiveness of the sealant.

The dynamic seal comprises impeller means mounted on, or attached to, a rotatable shaft of a rotary machine, said impeller means being interposed between a working chamber of said rotary machine in which working fluid circulates and through which said shaft extends and a stuffing box surrounding a segment of said shaft and containing a non-Newtonian high-viscosity sealant under sufficient pressure to promote adhesion of said sealant onto said shaft segment, wherein said impeller means is configured such that working fluid exiting said working chamber is urged by elements of said impeller means along a flow path from a first point at which said working fluid exiting said working chamber contacts said elements to a second point at which the working fluid pressure is substantially equal to, and in an opposite direction in counterbalancing fashion as, the working fluid pressure at said first point.

In one embodiment, the impeller means comprises at least one annular impeller disc, to front and rear faces of each of which are attached a plurality of vanes. A line connecting the working chamber and stuffing box corresponding to the disposition of the rotary machine shaft, which allows the machine to perform work when being rotated, has an orientation which will be referred to herein as "longitudinal". As referred to herein, "front" is longitudinally closer to the working chamber and "rear" is longitudinally closer to the stuffing box. The plurality of vanes are disposed at an acute angle with respect to the shaft axis, the vanes attached to an impeller disc front face being oriented and/or shaped differently than the vanes attached to the corresponding impeller disc rear face.

In one aspect, vanes attached to an impeller disc front face are oriented and/or shaped such that the working fluid is deflected to the front face periphery whereby to increase the working fluid pressure acting on the impeller disc periphery, and vanes attached to the corresponding impeller disc rear face are oriented and/or shaped such that the working fluid flowing from the front to rear face is deflected to a rear face central portion whereby to increase the working fluid pressure acting on the impeller disc central portion, the working fluid pressure acting on the impeller disc rear face central portion being substantially equal to, and in an opposite direction in counterbalancing fashion as, the working fluid pressure exiting the working chamber. Due to the substantial pressure equalization on the two faces of an impeller disc, most of the working fluid is prevented from flowing towards the stuffing box. The substantially stagnant working fluid in the vicinity of an impeller disc therefore serves as a barrier to prevent additional working fluid from exiting the working chamber.

The orientation and shape of the vanes also serve to deflect suspended solid particles, e.g. when the working fluid comprises slurry, in order to prevent from said solid particles to enter the stuffing box and to thereby reduce the effectiveness of the sealant.

When more than one impeller disc is employed each impeller disc is longitudinally spaced from an adjacent disc. A portion of the working fluid flowing from the front to rear face of a first impeller disc longitudinally flows along the rotary machine housing to a second impeller disc. The equalized pressure level of the working fluid at the second impeller disc is less than that at the first impeller disc.

In one aspect, an annular partition having a central opening to accommodate the shaft is connected to a housing wall at a connection point that is longitudinally spaced from the rear face of a corresponding impeller disc, said central opening being sufficiently sized such that working fluid that is longitudinally flowing along the housing wall to the second impeller disc is directed to the second impeller disc.

In one aspect, the at least one impeller disc is fixedly connected to a sleeve mounted on the shaft.

The invention is also directed to a system for reducing the pressure of sealant within a stuffing box of a rotary shaft, comprising:
a) a rotatable shaft connected to a rotor of a rotary machine adapted to perform work by means of said shaft;
b) a working chamber of said rotary machine in which working fluid circulates and through which said shaft extends;
c) a stuffing box surrounding a segment of said shaft and containing a non-Newtonian high-viscosity sealant under pressure, said stuffing box being longitudinally spaced from said working chamber, wherein said shaft segment is exposed to said sealant;
d) means for delivering said sealant on demand to an inlet port of said stuffing box when the pressure of said sealant within said stuffing box is less than a predetermined pressure, said predetermined pressure being sufficient to promote adhesion of said sealant onto said shaft segment and to thereby prevent or retard the egress of working fluid from said working chamber; and
e) impeller means mounted on, or attached to, said shaft, said impeller means being interposed between said working chamber and said stuffing box, wherein said impeller means is configured such that working fluid exiting said working chamber is urged by elements of said impeller means along a flow path from a first point at which said working fluid exiting said working chamber contacts said elements to a second point at which the working fluid pressure is substantially equal to, and in an opposite direction in counterbalancing fashion as, the working fluid pressure at said first point, wherein said predetermined pressure of said sealant within said stuffing box is substantially equal to the working fluid pressure at said second point.

DETAILED DESCRIPTION OF PREFERRED EMBODIMENTS

The present invention is a novel apparatus for delivering viscous sealant at a predetermined pressure to a stuffing box of a machine, e.g. a rotary machine such as a pump, compressor, and turbine, which produces work by means of a shaft and a working fluid circulating within a working chamber. The apparatus comprises a sealant delivery unit which automatically delivers sealant by means of a constant external force when the sealant pressure within a stuffing box in proximity to the working chamber is lowered, indicating sealant erosion. The sealant pressure within the stuffing box is sufficient to promote the adhesion of sealant to the shaft.

The following description relates to the adhesion of sealant to a rotary shaft, but it will be appreciated that the invention can be similarly implemented to facilitate the adhesion of sealant to a linearly displaceable shaft.

Figure 1:
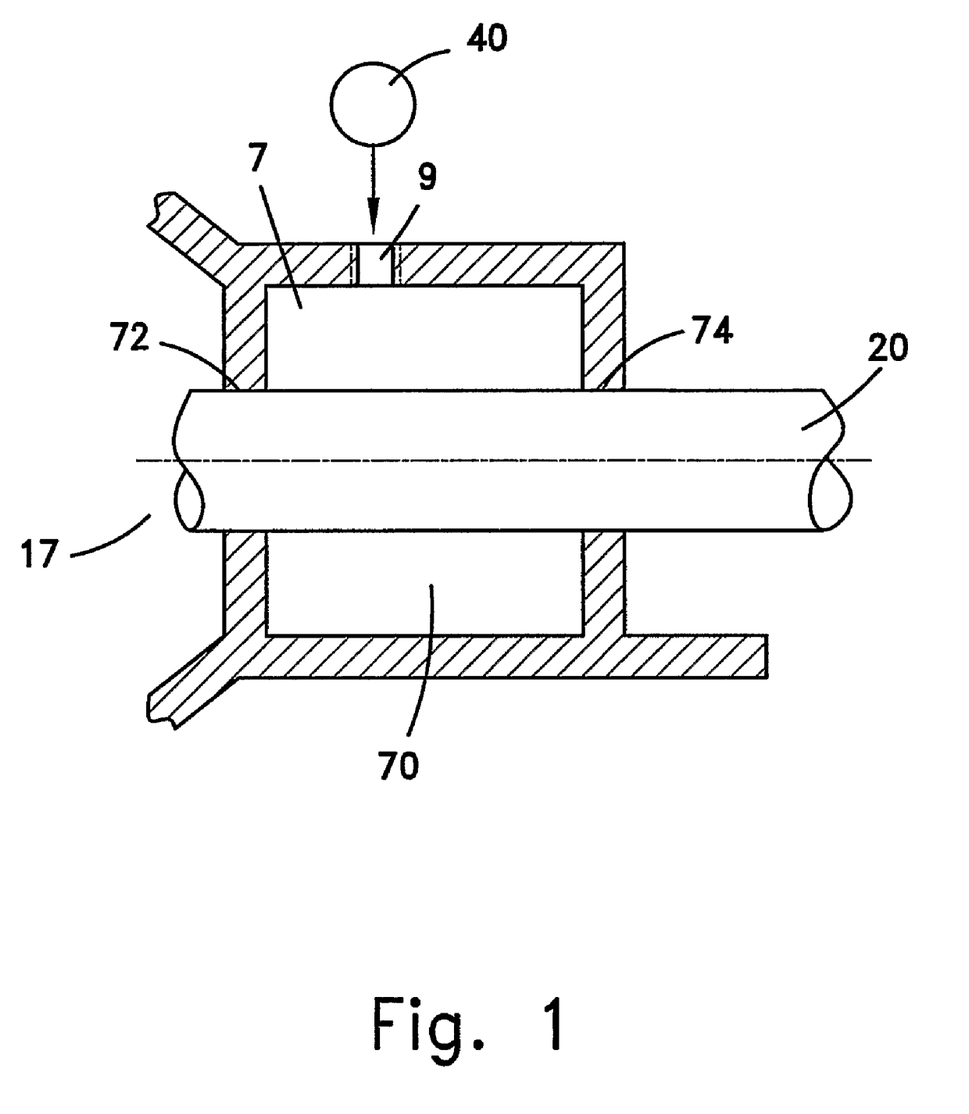
FIG. 1 is a vertical cross section of one configuration of a stuffing box.

FIG. 1 illustrates a vertical cross section of one configuration of a stuffing box 70 which is adjacent to working chamber 17. Stuffing box 70 encircles rotatable shaft 20 and serves to seal its two shaft openings 72 and 74 with sealant 7 characterized by a high-viscosity non-Newtonian liquid made of a blend of synthetic fibers, lubricants, and binding agents introduced from inlet port 9 by sealant delivery unit 40. The combined effect of the sealant pressure within stuffing box 70 and the surface tension of the sealant adhering to shaft 20 at shaft opening 72 is sufficient to prevent the passage of the working fluid from working chamber 17 to stuffing box 70. Stuffing box 70 may be sufficiently small and therefore of a sufficiently low cost to warrant a retrofit of an existing shaft opening sealing apparatus with use of the sealant delivery apparatus of the present invention.

Figure 2:
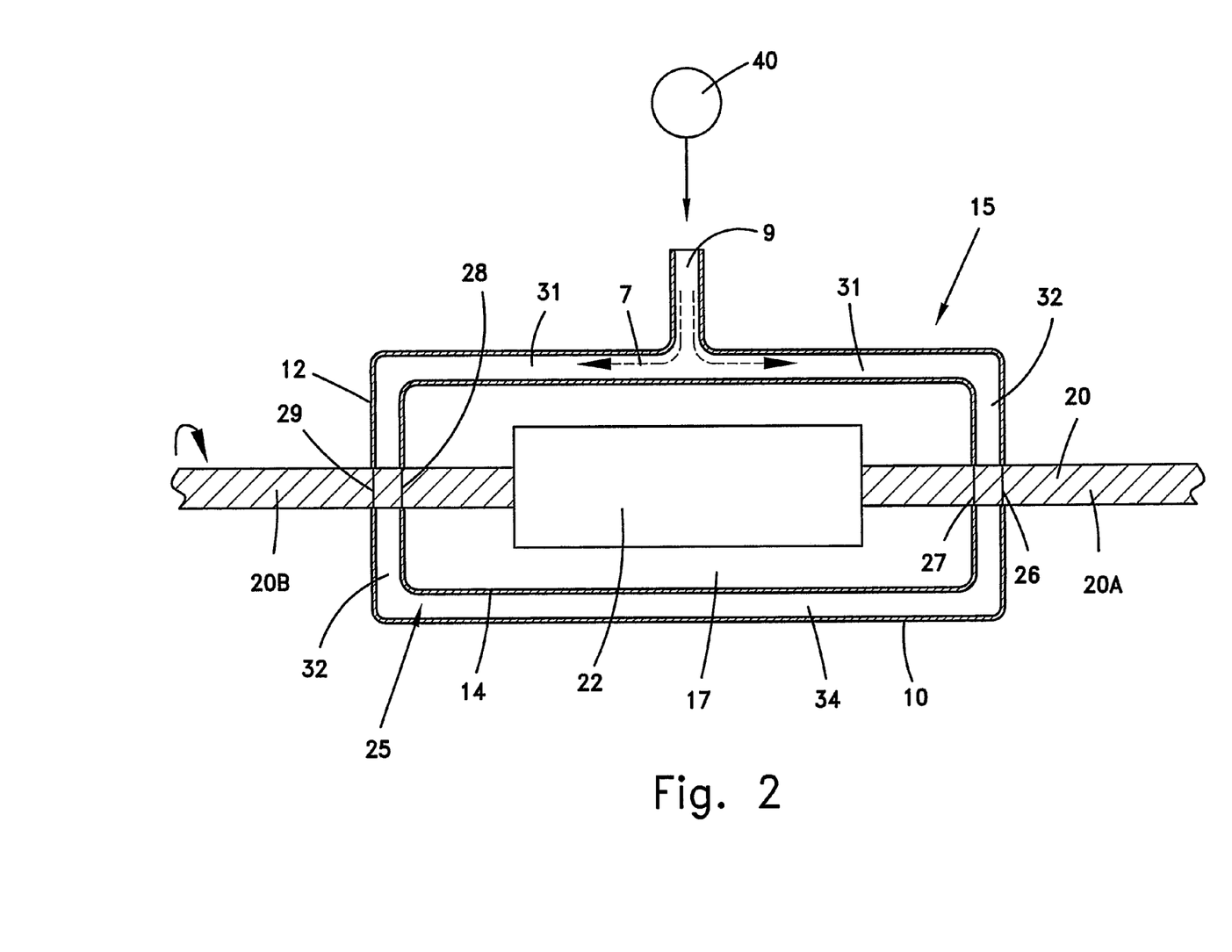
FIG. 2 is a schematic vertical cross section of another configuration of a stuffing box.

FIG. 2 schematically illustrates another configuration of a stuffing box in the form of a sealing channel 25. Sealing channel 25 is shown in a vertical and longitudinal cross section. Housing 10 of rotary machine 15, which is adapted to produce work upon rotation of main shaft 20, is formed with a channel 25 between the housing outer surface 12 and inner surface 14. Channel 25 has at least one upper longitudinally extending portion 31, through which sealant 7 is introduced from inlet port 9, and at least one shaft surrounding portion 32 in communication with the corresponding upper longitudinally extending portion 31. The illustrated channel 25 also has a lower longitudinally extending portion 34 in communication with the two shaft surrounding portions 32. Housing inner surface 14 defines a working volume 17, in which one or more work producing rotating elements 22 of rotary machine 15 (hereinafter a "rotor") in conjunction with a fluid introduced into one or more chambers, performs a work cycle.

One or two ends of shaft 20, the number of which depending on the configuration of rotary machine 15, is connected to a rotor 22. Shaft 20 is shown to have two ends 20A and 20B, and each of the ends is shown to pass through housing 10 at two corresponding shaft openings. That is, shaft end 20A passes through shaft openings 26 and 27 and shaft end 20B passes through shaft openings 28 and 29. Each shaft surrounding portion 32 surrounds shaft 20 such that the width of the former with respect to a cross section perpendicular to the illustrated cross section is smaller than that of housing 10, yet is considerably wider than the diameter of shaft 20, to allow sealant to be reliably delivered on demand, as will be described hereinafter, to the sealant channel. Sealant 7 is delivered to sealant channel 25, to prevent the loss of working fluid through the shaft openings. Since sealant 7 is pressurized within each shaft surrounding portion 32, the sealant adheres to the rotating shaft 20 until each corresponding shaft opening is occluded.

Inlet port 9, through which sealant 9 is introduced to channel 25, is centrally located within housing outer surface 12. When two upper longitudinally extending portions 31 are employed, as shown, the location of inlet port 9 is selected such that each longitudinally extending portion 31 is symmetrical. Thus sealant introduced into only one inlet port may be delivered to the shaft openings of two shaft ends 20A and 20B. The pressure of sealant 7 introduced to each longitudinally extending portion 31 is therefore substantially equal. Similarly, the pressure of sealant 7 within each shaft surrounding portion 32 is substantially equal. Due to the presence of a substantially uniform sealant pressure within conduit 25, the sealant pressure constitutes a parameter which is indicative of a diminishment of sealant at a shaft opening. The sealant pressure is generated at a constant initial pressure by means of sealant delivery unit 40, which will be described hereinafter. Following erosion of sealant 7 at a shaft opening during operation of rotary machine 15, the sealant pressure is consequently reduced and additional sealant is subsequently introduced to inlet port 9 by means of sealant delivery unit 40.

Figure 4:
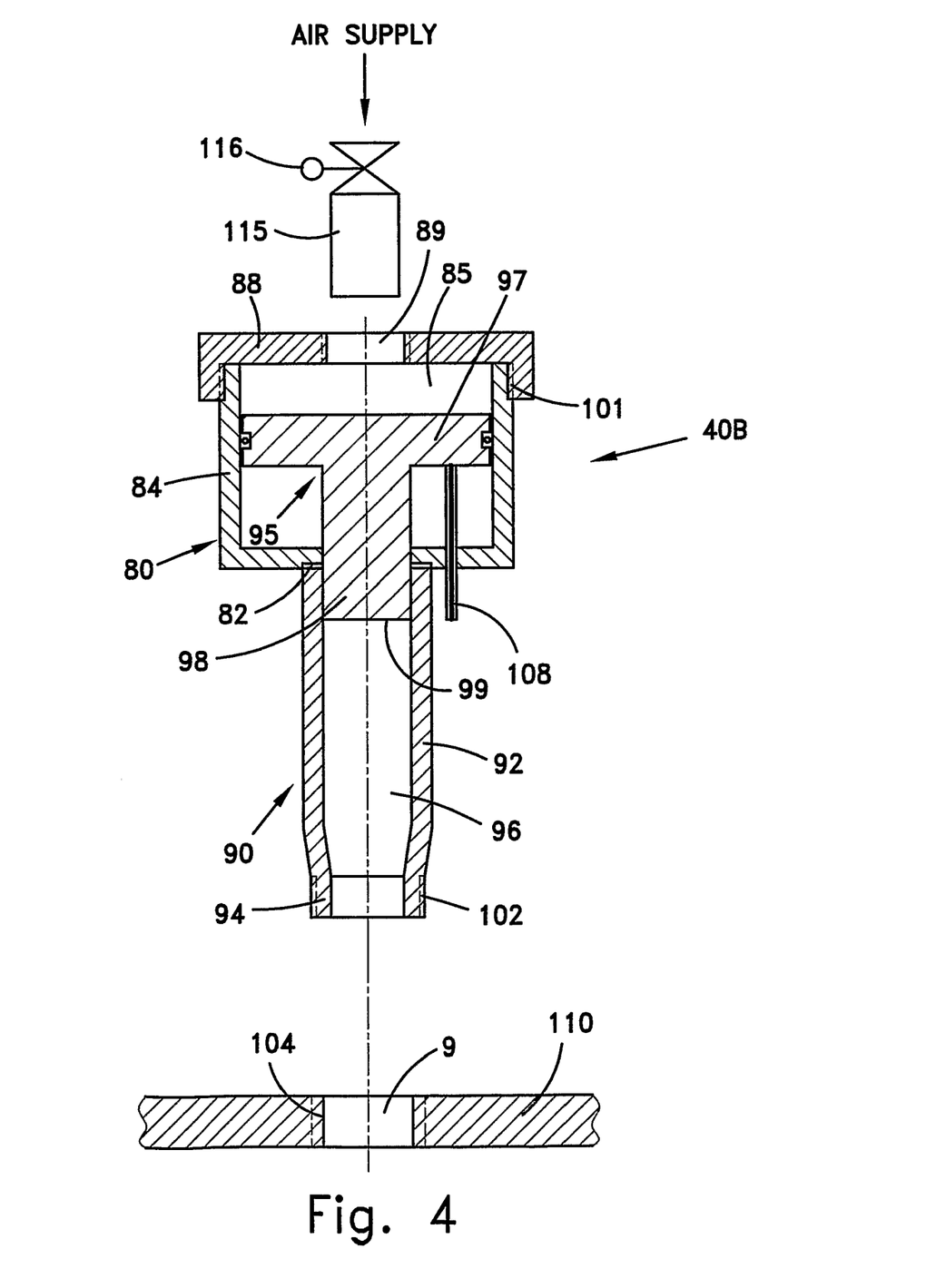
FIG. 4 is a vertical cross section of another and preferred embodiment of a sealant delivery unit.

FIG. 4 illustrates a preferred embodiment of a sealant delivery unit, which is generally indicated by 40B. Sealant delivery unit 40B comprises piston retainer 80, sealant chamber 90, and retainer cover 88. Sealant chamber 90, which is releasably engageable with the underside of retainer 80, e.g. by threaded connection 82, is narrower than that of piston retainer 90 and has straight, vertically disposed walls 92 that narrow at its proximal end, i.e. in a direction towards inlet port 9 of machine 110, to neck 94. Piston 95 has a distal portion 97, i.e. in a direction away from inlet port 9, and a proximal portion 98 having a smaller width than distal portion 97. The width of piston distal portion 97 is substantially equal to that of the retainer cavity 85 such that the sides of distal portion 97 are in resilient contact with the inner face of walls 84 of retainer 80. The width of piston proximal portion 98 is substantially equal to that of the sealant chamber cavity 96 such that the sides of proximal portion 98 are in contact with the inner face of walls 92 of sealant chamber 90. The length of piston proximal portion 98 is less than that of walls 92 of sealant chamber 90. Neck 94 of sealant chamber 90 is formed with external threading 102. Cover 88 has a central opening 89 through which compressed air, or any other pressurized gas, for proximally displacing piston 95 is introduced to retainer cavity 85 via duct 115. Cover 88 is releasably engageable with piston retainer 80, e.g. by threaded connection 101. The underside of piston distal portion 97 is provided with a position indicator 108, e.g. a mechanical or electrical indicator, by which the relative position of piston 95, and therefore the amount of sealant retained in the stuffing box, may be determined. Sealant delivery unit 40B is suitable to deliver sealant to stuffing box 70 of FIG. 1 or to sealing channel 25 of FIG. 2.

In operation, sealant is introduced into sealant chamber 90. To prevent the passage of sealant through neck 94, a bottom plate (not shown) may be temporarily placed under sealant chamber 90 or may be in threaded engagement with external threading 102. Piston retainer 80 is then coupled with sealant chamber 90 while piston 95 is in its most distal position. After uncovering neck 94, sealant delivery unit 40B is then engaged with rotary machine housing 110, e.g. by means of external threading 102 of neck 94 and internal threading 110 surrounding inlet port 9, such that sealant chamber cavity 96 is in fluid communication with the inlet port and with the stuffing box. When compressed air is introduced through central opening 89 of cover 88, which is coupled to duct 115, the air pressure within retainer cavity 85 achieves a predetermined constant value. The pressure within retainer cavity 85 is regulated by control valve 116. Due to the predetermined pressure within retainer cavity 85 which acts on distal portion 97, piston 95 is proximally displaced, causing sealant to be discharged from sealant chamber 90 at a corresponding predetermined delivery pressure after being contacted by piston proximal portion 98. As the compressed air pressure continues to act on piston 95, the latter is proximally and incrementally displaced and the sealant pressure within the stuffing box increases. When the sealant pressure within the stuffing box is substantially equal to the pressure applied by proximal portion 98 onto the sealant, piston 95 ceases to be proximally displaced. During the subsequent erosion of the solidified sealant, the sealant pressure decreases. Due to the pressure differential between the pressure applied by proximal portion 98 and the sealant pressure within the stuffing box, piston 95 is proximally displaced. Piston 95 may also be distally displaced if the sealant within the stuffing box becomes over pressured, i.e. when the stuffing box sealant pressure is greater than the pressure applied by proximal portion 98. After a predetermined proximal displacement of cylinder 95, an employee determines by means of position indicator 108 that the supply of sealant within sealant chamber 90 needs to be replenished. After the compressor (not shown) is deactivated, piston 95 is distally displaced. The sealant delivery unit 40B having the depleted supply of sealant is separated from housing 110 and a second delivery unit 40B which has been previously loaded with sealant is then easily coupled to housing 104.

Since proximal portion 98 is narrower than distal portion 97, piston 95 advantageously serves as a pressure booster. While the air pressure within retainer cavity 85 generates a proximal force which acts on proximal portion 98, the same force is transmitted to proximal face 99 of portion 98 so that the sealant within sealant chamber 96 is exposed to a larger pressure. Thus the delivery pressure applied to the sealant within sealant chamber 90 may be increased without requiring retainer 80 to be a large pressure vessel. The pressure increase provided by piston 95 is dependent on the surface area ratio between distal portion 97 and proximal portion 98, and may typically be as much as 10:1, or even 50:1.

Figure 3:
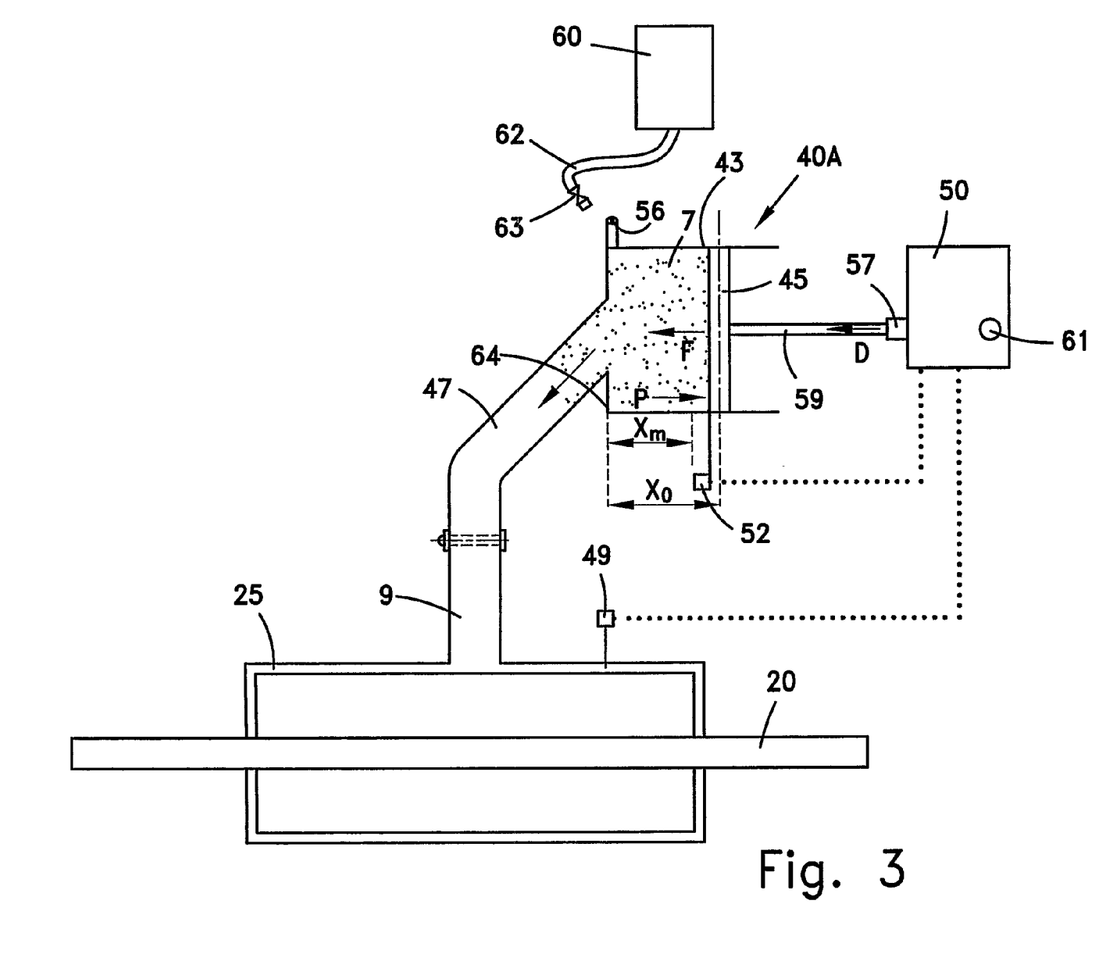
FIG. 3 schematically illustrates a sealant delivery unit, according to one embodiment of the invention.

FIG. 3 illustrates another embodiment of a sealant delivery unit, which is generally indicated by 40A. In this embodiment, sealant delivery unit 40A pressurizes the sealant by applying a constant force F thereto. Sealant delivery unit 40A comprises sealant chamber 43 containing sealant 7, axially displaceable piston 45, e.g. longitudinally displaceable, conduit 47, controller 50, and pressure sensor 49 and position sensor 52 in electrical communication with controller 50. Pressure sensor 49 is in fluid communication with sealant channel 25. Piston 45 is inserted within, and shaped in similar fashion as, sealant chamber 43. Conduit 47 is permanently attached to the housing and extends from sealant chamber 43 to inlet port 9 of stuffing box 25.

Sealant 7, which is contained in reservoir 60 and transferable therefrom via hose 62 and valve 63 in communication with hose 62, is manually introduced into sealant chamber 43 when its spring biased check valve 56 is depressed. As sealant 7 is introduced into sealant chamber 43, piston 45 is distally displaced and the volume of sealant chamber 43 increases. To initially deliver sealant 7 to the sealant channel 25, operating button 61 of controller 50 is depressed. Controller 50 then commands linear drive device 57, such as a linear motor or any other means well known to those in the art to generate a constant linear driving force D, which is connected to piston rod 59, to proximally displace piston 45. As piston 45 is proximally displaced and applies a constant force F to sealant 7 contained within sealant chamber 43, the sealant pressure increases, causing the sealant to be delivered through conduit 47 to sealant channel 25. Piston 45 continues to be proximally displaced until the sealant pressure is substantially equal to a predetermined value P, at which sealant is able to adhere to shaft 20 at the shaft openings and prevent the egress of working fluid through the latter. When the sealant pressure is substantially equal to P, the force applied by the sealant pressure onto piston 45 is equal to, and of an opposite direction as, force D generated by linear drive device 57 to proximally displace piston 45, causing piston 45 to stop its displacement. Piston 45 remains in a stationary position at a distance $x_o$ from edge 64 of sealant chamber 43 closest to conduit 47, as detected by position sensor 52. Although piston 45 ceases to be displaced, sealant 7 disposed within conduit 25 continues to be pressurized by a pressure P so that the shaft openings will remain occluded due to the presence of the sealant which adheres to shaft 20.

If the adhered sealant becomes diminished in size due to friction during the rotation of shaft 20, the surface tension of the sealant at the shaft openings is reduced and sealant exudes therefrom. Due to the slow egress of sealant from conduit 25, the pressure of the sealant is reduced below P. Consequently, piston 45 once again is displaced towards conduit 47 due to the greater force F of the piston acting on the sealant within sealant chamber 43 relative to the pressure derived force of the sealant, and ceases to be displaced at a distance less than $x_o$ from edge 64 when the sealant pressure increases to P. Once piston 45 is located less than a predetermined minimal distance $x_m$ from edge 64, position sensor 52 transmits a signal to controller 50 to generate a low level alarm. An employee reacts to the low level alarm by introducing additional sealant to sealant chamber 43 from reservoir 60, after placing hose 62 on top of check valve 56 of sealant chamber 43, depressing check valve 56, and opening valve 63 of hose 62. Alternatively, or in unison with position sensor 52, controller 50 commands linear drive device 57 to increase the driving force D if pressure sensor 49 detects a sealant pressure less than a minimal predetermined pressure.

Figure 5:
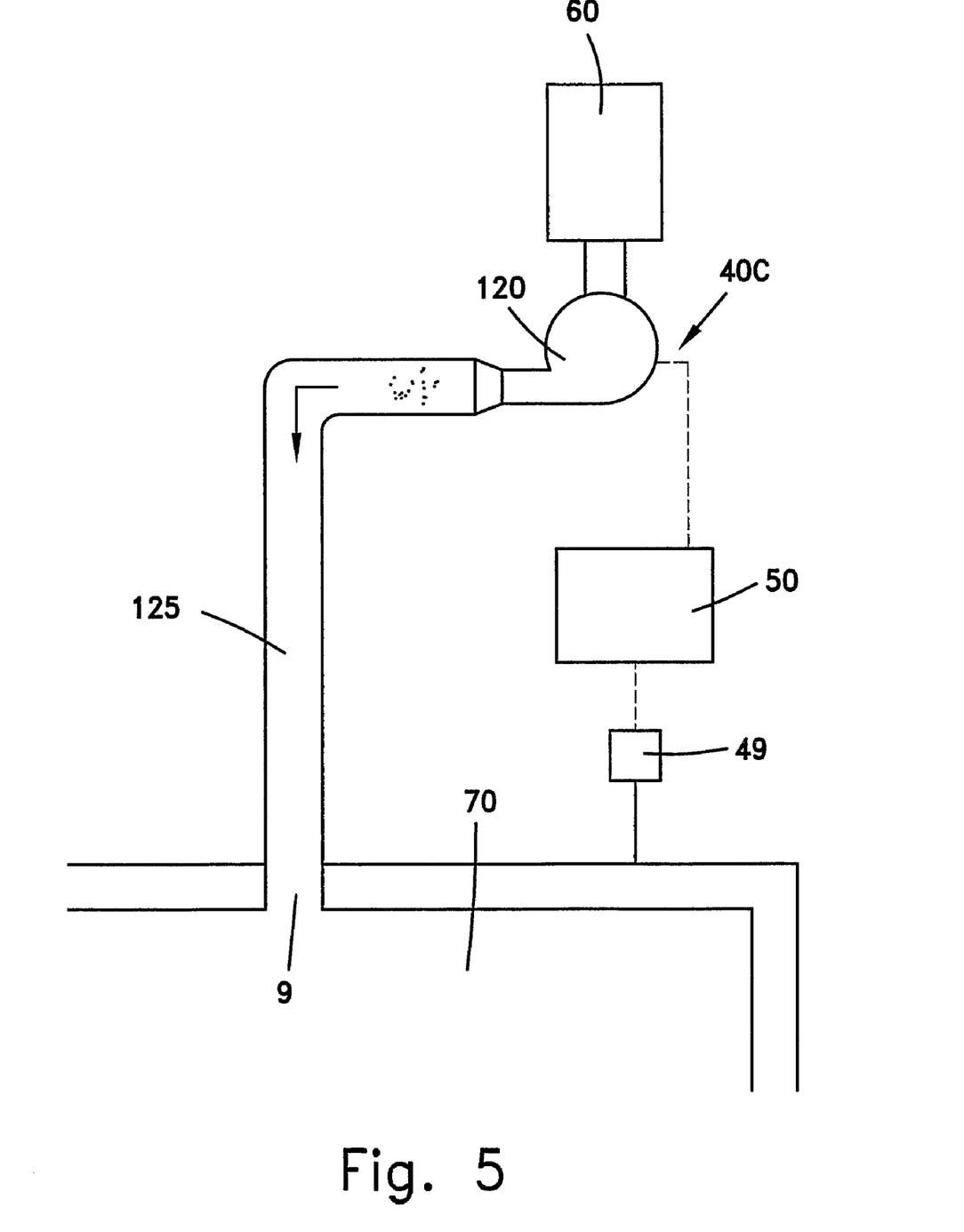
FIG. 5 schematically illustrates another embodiment of sealant delivery unit.

FIG. 5 illustrates another embodiment of a sealant delivery unit, which is generally indicated by 40C. Sealant delivery unit 40C comprises pump 120, e.g. a peristaltic pump, for delivering sealant from reservoir 60 to stuffing box 70 when the sealant pressure decreases below a predetermined level. Pressure sensor 49 in fluid communication with stuffing box 70 is in electrical communication with controller 50. When the sealant pressure within stuffing box 70 decreases to a level below a first predetermined pressure as detected by pressure sensor 49, controller 50 transmits a signal to activate pump 120. Pump 120 draws sealant from reservoir 60 and delivers the same through conduit 125 to inlet port 9 of stuffing box 70. When the sealant pressure is greater than a second predetermined pressure as detected by sensor 49, controller 50 transmits a signal to deactivate pump 120.

As described hereinabove, the stuffing box pressure is maintained above a predetermined pressure by means of one of the aforementioned delivery units. The predetermined pressure is not only that sealant pressure which is suitable to promote adhesion of the sealant onto the rotary shaft, but also which is sufficient to retard leakage of working fluid from the working chamber to the stuffing box through the shaft openings. The sealant pressure need not be equivalent to the working fluid chamber due to the contribution of the surface tension of the sealant adhering to the shaft, which retards the infiltration of working fluid to the stuffing box. Leakage may be noticeable, however, if the pressure differential between the working chamber and stuffing box is greater than a threshold level such that the pressure-derived force acting on the shaft openings penetrates the sealant that adhered to the shaft. The predetermined pressure maintained by a sealant delivery unit therefore needs to be increased, to a level slightly below the working fluid pressure, when the working fluid pressure is relatively high. The predetermined pressure at which the sealant is maintained is preferably established as a result of experimentation.

As the sealant pressure is increased, the lost work, or work expended as a result of the frictional forces between the rotating shaft and the sealant correspondingly increases. The lost work is directly proportional to the product of the shaft diameter, rotational speed of the shaft, and the frictional forces between the shaft and the sealant that adhered to the wall of the corresponding shaft opening. Since the frictional forces between the shaft and the sealant are directly proportional to the sealant pressure, it follows that the lost work is also directly proportional to the sealant pressure.

An increase in lost work is undesirable since the overall efficiency of the rotary machine decreases. Also, the lost work is dissipated in the form of heat energy, causing the temperature of the sealant in the vicinity of a shaft opening to increase. When the sealant temperature exceeds a recommended maximum temperature, a risk of sealant flammability exists, and additionally, the rate of heat transfer from the sealant to the working fluid is such that local boiling and cavitation within the working fluid is liable to result, particularly when the working fluid is water. If the working fluid is a gas, an excessive increase in the working fluid pressure, which is liable to compromise the operability of the rotary machine, will result. Even though the lost work would decrease if the operating conditions of the rotary machine, such as working fluid pressure or shaft speed, were changed, such changes would further lower the overall machine efficiency since the predetermined operating working conditions have been selected to achieve optimal machine efficiency.

Figure 6:
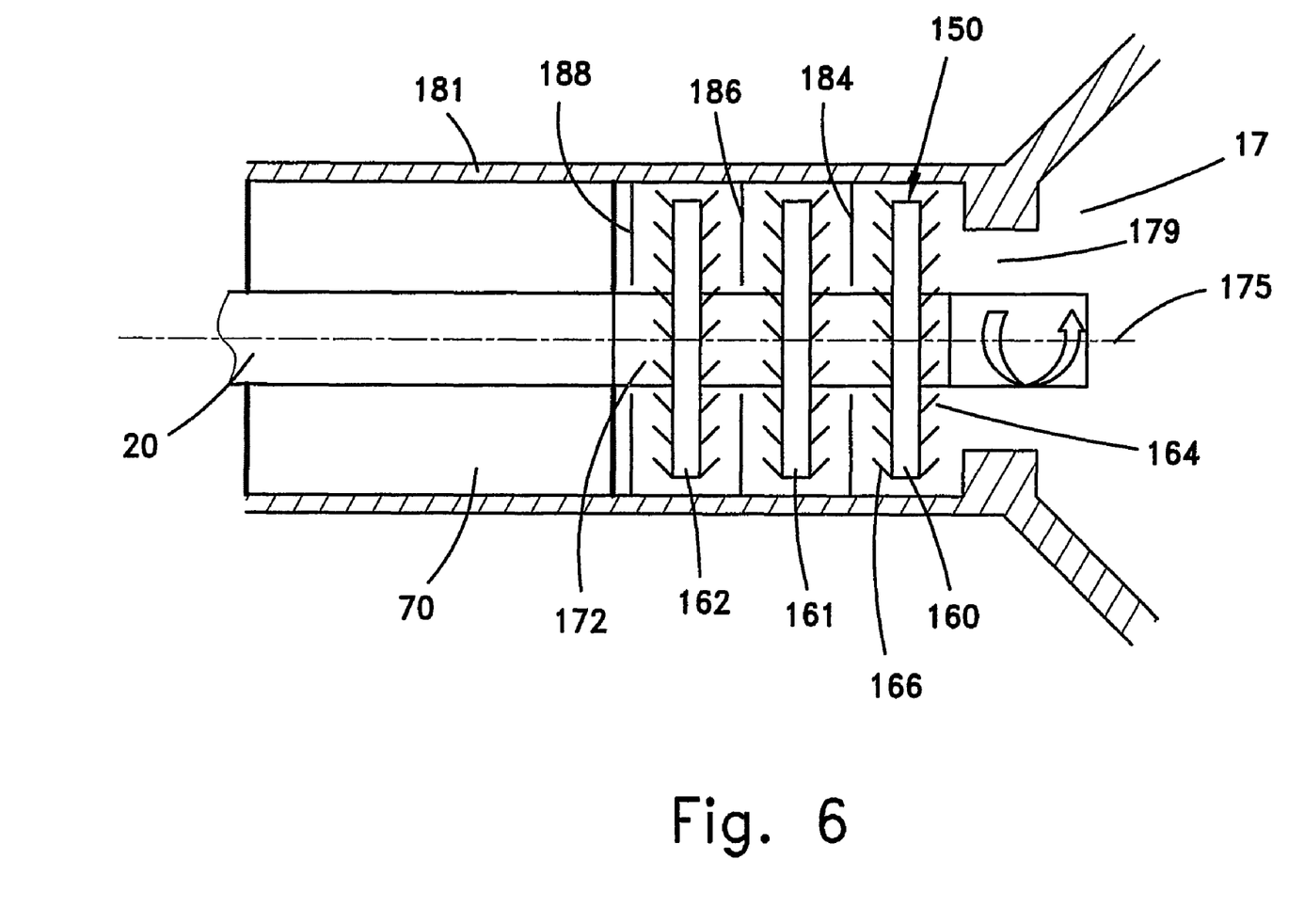
FIG. 6 is a schematic, vertical cross-sectional view of a dynamic seal mounted on a rotary shaft.

FIG. 6 illustrates a vertical cross section of another embodiment of the invention wherein the sealant pressure may be advantageously reduced without affecting the overall machine efficiency. In this embodiment, a dynamic seal is provided to induce a pressure barrier to the working fluid. The net working fluid pressure to which the sealant is exposed is thereby lowered, and therefore the sealant pressure may be lowered as well. A reduced sealant pressure results in a lower temperature of the sealant and in an increase of useful work that the machine can perform.

As shown, dynamic seal 150 comprises three impeller discs 160-162, on the front and rear faces of each of which are attached a plurality of vanes 164 and 166, respectively. It will be appreciated that dynamic seal 150 is also effective when a different number of impeller discs, e.g. one impeller disc, is employed; however, the working fluid pressure to which the sealant is exposed will be further reduced as the number of impeller disc increases, As referred to herein, "front" means the side which is closest to working chamber 17 and "rear" means the side which is closest to stuffing box 70. The plurality of vanes 164, which may be planar and mutually parallel as shown or of any other suitable configuration, are disposed at an acute angle with respect to shaft axis 175. The three impeller discs 160-162 are fixedly connected to sleeve 172, which in turn is mounted to rotary shaft 20. Working fluid that exits working chamber 17 encounters the rotating impeller discs and changes direction.

Dynamic seal 150, which is longitudinally interposed between working chamber 17 and stuffing box 70, is configured to achieve substantial pressure equalization on the two faces of each impeller disc 160-162. To achieve substantial pressure equalization on the two faces of each impeller disc, the front vanes 164 of each impeller disc are oriented and/or shaped differently than the corresponding rear vanes 166. In the illustrated example, front vanes 164 are symmetrical to, and are disposed at an angular difference of 90 degrees with respect to, rear vanes 166. After passing through shaft opening 179, the working fluid contacting the front vanes 164 is deflected towards the periphery of the corresponding impeller disc, whereby its velocity energy is converted into pressure energy. As the higher pressure working fluid flows over the periphery of the corresponding impeller disc towards stuffing box 70, the rear vanes 166 deflect the working fluid towards the center of the corresponding impeller disc such that the working fluid pressure is greater at a central portion of the disc than at a peripheral portion thereof. The corresponding impeller disc is therefore in substantial hydraulic balance while the working fluid pressure that varies radially along the front face of the impeller disc is equal to, and in an opposite direction in counterbalancing fashion as, the working fluid pressure that varies radially along the rear face of the impeller disc. Thrust bearings (not shown) may be used if some slight unbalance occurs. Due to the substantial pressure equalization on the two faces of an impeller disc, most of the working fluid is prevented from flowing towards stuffing box 70. The stagnant working fluid therefore serves as a barrier to prevent additional working fluid from exiting working chamber 17.

Although most of the working fluid that exits working chamber 17 through shaft opening 179 is directed to a central portion of the rear face of impeller disc 160 by the corresponding rear vanes 166, some of the working fluid flows longitudinally along the inner face of housing wall 181 that extends from shaft opening 179 to stuffing box 70. A circular partition 184 with a central opening to accommodate shaft 120 is connected to housing wall 181 at a connection point that is longitudinally displaced from the rear face of impeller disc 160. Partition 184 is sufficiently radially spaced from shaft 20 to allow working fluid which has flowed longitudinally along the inner face of housing wall 181 and has been deflected by the partition to flow longitudinally along shaft 20 and to encounter front vanes 164 of impeller disc 161. Similarly, partition 186 is interposed between impeller discs 161 and 162. Partition 188 longitudinally spaced from impeller disc 162 serves as a wall of stuffing box 70 as well as a shaft opening. In this fashion, dynamic seal 150 provides a cascading three-stage pressure equalizing action such that the working fluid pressure that develops at impeller discs 160-162 is sequentially reduced. The sealant pressure therefore may be correspondingly reduced without a reduction in the level of sealing and of overall machine efficacy.

It will be appreciated that the dynamic seal may fixedly attached to the shaft and that it may embodied by other configurations, such as an Archimedian spiral, that are suitable for inducing a pressure barrier to the working fluid.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A viscous sealant delivery unit for automatically delivering said sealant at an adjustable and continuously controllable pressure to a stuffing box of a shaft, comprising:
   a) a piston retainer and retainer cover;
   b) a sealant chamber in which a high-viscosity sealant is introducible thereto from a suitable reservoir, said sealant chamber being releasably engageable with the underside of said piston retainer and being releasably engageable with a portion of a machine housing that surrounds an inlet port of a stuffing box to which a shaft segment is exposed such that a sealant chamber cavity is in fluid communication with said inlet port and with the stuffing box, wherein said sealant chamber is narrower than said piston retainer;
   c) a piston for boosting the pressure of sealant within said sealant chamber, said piston comprising a distal portion and a proximal portion having a smaller width than said distal portion, said piston being configured to be received in said piston retainer such that sides of said distal portion are in resilient contact with walls of said retainer and sides of said proximal portion are in contact with walls of said sealant chamber, the length of said proximal portion being less than that of the sealant chamber walls, wherein said proximal portion is incrementally displaceable
   d) means for controlling the pressure of said pressurized sealant to deliver said sealant on demand at a delivery pressure when the pressure of said sealant within said stuffing box is less than said delivery pressure, said delivery pressure being sufficient to promote adhesion of said sealant onto said shaft segment and to thereby prevent or retard the egress of working fluid from a corresponding working chamber of a machine adapted to perform work by means of said shaft, and further being continuously controllable throughout operation of said machine, wherein said control means comprises a compressed fluid externally deliverable to said piston retainer for applying a proximal driving force onto said distal piston portion, and a control valve in communication with said compressed fluid for controlling the pressure of said compressed fluid to generate said driving force to a level which is suitable for pressurizing said pressurized sealant to said delivery pressure.

2. The delivery unit according to claim 1, wherein the retainer cover has a central opening through which the compressed fluid is introduced into the piston retainer for proximally displacing the piston.

3. The delivery unit according to claim 1, wherein the sealant chamber walls has straight, vertically disposed walls that narrow at its proximal end to form a neck from which sealant is dischargeable to the stuffing box.

4. The delivery unit according to claim 1, wherein the delivery unit further comprises a position indicator connected to the piston which is indicative of the relative position of the piston and therefore of the amount of sealant retained in the stuffing box.

5. The delivery unit according to claim 1, further comprising a controller and a pressure sensor in electrical communication with a level detector for detecting the stuffing box pressure.

6. The delivery unit according to claim 5, wherein the controller is suitable for emitting a signal when the stuffing box pressure is less than a predetermined minimum value.

7. The delivery unit according to claim 6, wherein the controller is in communication with the control valve and is suitable for increasing the proximal driving force when the sealant pressure is less than a minimum value and for decreasing the proximal driving force when the sealant pressure is greater than a maximum value.

8. The delivery unit according to claim 1, further comprising a controller and a position sensor in electrical communication with a level detector for detecting the relative position of the piston.

9. The delivery unit according to claim 8, wherein the controller is suitable for emitting a signal when the amount of sealant retained in the sealant chamber is less than a minimum value.

10. The delivery unit according to claim 1, wherein the shaft is a rotary shaft.

11. The delivery unit according to claim 1, wherein the shaft is a linearly displaceable shaft.

* * * * *